United States Patent
Baig et al.

(10) Patent No.: US 6,956,407 B2
(45) Date of Patent: Oct. 18, 2005

(54) PRE-EMPHASIS CIRCUITRY AND METHODS

(75) Inventors: Mashkoor Baig, Ottawa (CA); Shoujun Wang, Nepean (CA); Haitao Mei, Ottawa (CA); Bill Bereza, Nepean (CA); Tad Kwasniewski, Ottawa (CA)

(73) Assignee: Altera Corporation, San Jose, CA (US)

( * ) Notice: Subject to any disclaimer, the term of this patent is extended or adjusted under 35 U.S.C. 154(b) by 161 days.

(21) Appl. No.: 10/702,195

(22) Filed: Nov. 4, 2003

(65) Prior Publication Data
US 2005/0093580 A1  May 5, 2005

(51) Int. Cl.$^7$ ............................................. H03K 5/22
(52) U.S. Cl. .................... 327/65; 327/141; 327/560; 330/252
(58) Field of Search ................. 327/141, 161, 327/333, 560, 561, 563; 330/252, 253, 261

(56) References Cited

U.S. PATENT DOCUMENTS

| | | | |
|---|---|---|---|
| 3,633,120 A | 1/1972 | Battjes | 330/30 R |
| 4,723,110 A | 2/1988 | Voorman | 330/252 |
| 5,420,538 A | 5/1995 | Brown | 330/252 |
| 6,133,773 A * | 10/2000 | Garlepp et al. | 327/247 |
| 6,236,231 B1 | 5/2001 | Nguyen et al. | 326/39 |
| 6,281,715 B1 | 8/2001 | DeClue et al. | |
| 6,288,581 B1 | 9/2001 | Wong | |
| 6,377,076 B1 | 4/2002 | Gauthier | |
| 6,650,140 B2 | 11/2003 | Lee et al. | 326/39 |
| 2003/0052709 A1 | 3/2003 | Venkata et al. | 326/37 |
| 2003/0090307 A1 * | 5/2003 | Shin | 327/200 |
| 2003/0141919 A1 * | 7/2003 | Wang et al. | 327/390 |

OTHER PUBLICATIONS

U.S. Appl. No. 10/317,262, filed Dec. 10, 2002, Venkata et al.
U.S. Appl. No. 10/317,264, filed Dec. 10, 2002, Venkata et al.
U.S. Appl. No. 10/349,541, filed Jan. 21, 2003, Venkata et al.
U.S. Appl. No. 10/454,626, filed Jun. 03, 2003, Lui et al.
U.S. Appl. No. 10/640,824, filed Aug. 13, 2003, Wang et al.
U.S. Appl. No. 10/640,825, filed Aug. 13, 2003, Wang et al.

(Continued)

*Primary Examiner*—Kenneth B. Wells
*Assistant Examiner*—Khareem Almo
(74) *Attorney, Agent, or Firm*—Fish & Neave IP Group of Ropes & Gray LLP; Robert R. Jackson; Hong S. Lin (57) ABSTRACT

Pre-emphasis is given to differential output signals emanating from a pair of output nodes by initially (after an input data signal transition) connecting at least two current circuits to only one of the nodes. After a time delay, one of the current circuits is switched to connect only to the node to which the current circuits were not previously connected if there has been no further transition in the input data signal during the time delay. If only single-ended (i.e., non-differential) output is desired, only one of the output nodes is used as an output signal source. More than two current circuits may be used, and their switching from one node to the other may be performed progressively to provide pre-emphasis having any of many different characteristics.

26 Claims, 8 Drawing Sheets

OTHER PUBLICATIONS

U.S. Appl. No. 10/702,196, filed Nov. 04, 2003, Bereza et al.
U.S. Appl. No. 10/756,949, filed Jan. 13, 2004, Kwasniewski et al.
U.S. Appl. No. 10/757,182, filed Jan. 13, 2004, Baig et al.
B. Gilbert, "The Multi-Tanh Principle: A Tutorial Overview", IEEE Journal of Solid-State Circuits, vol. 33, No. 1, Jan. 1998.

* cited by examiner

PRE-EMPHASIS CIRCUITRY AND METHODS

BACKGROUND OF THE INVENTION

This invention relates to circuitry for use in transmitters in differential or single-ended signalling circuitry or systems.

In order to compensate for losses in the transmission of data signals—especially in digital systems operating at high speeds with low voltage signals—it may be desired to give the data signals what is called pre-emphasis. Pre-emphasis is extra power (usually extra voltage, but extra current may be an equivalent) immediately adjacent each transition in the level of the digital data signal. Pre-emphasis (provided by the circuitry transmitting the signal) helps to compensate for losses in transmission of the signal to receiver circuitry, and thereby helps the receiver circuitry respond more correctly to each transition in the transmitted signal.

Known pre-emphasis circuitry (e.g., for low voltage differential signalling ("LVDS")) may benefit from improvement, especially as systems attempt to use lower and lower power supply voltages. For example, such known LVDS pre-emphasis circuitry may employ both PMOS and NMOS transistors in an H-bridge type of topology, but PMOS transistors are inherently slower in switching and take more layout area. Also, this type of output driver circuitry needs common-mode feedback circuitry for better control of common mode swing under process corners. In addition, this type of circuitry requires higher supply voltages due to the stacked transistors, and thus headroom is an issue.

SUMMARY OF THE INVENTION

In accordance with this invention, circuitry for giving pre-emphasis to a pair of differential output signals emanating, respectively, from a pair of output nodes includes first and second current circuits, and switching circuitry that responds to an input signal by initially connecting both of the current circuits to only one of the output nodes, and by subsequently connecting one (but not the other) of the current circuits to the other output node if there has been no change in the input signal for a sufficiently long time. The current circuits may be current sinking circuits, and each of the output nodes may have a connection through a respective resistor to a power supply voltage source. A time delay between the initial and subsequent conditions of the switching circuitry may be established by clocking the input signal through a plurality of cascaded registers (flip-flops). This time delay (which is approximately the duration of the pre-emphasis) may be equal to the duration of a pulse in the input signal or a fraction of the duration of a pulse in the input signal.

A method in accordance with the invention for giving pre-emphasis to differential signals at a pair of output nodes includes connecting first and second current circuits to only a selected one of the nodes in response to receipt of an input signal, and, after a time delay interval, connecting only the second of the current circuits to only the one of the nodes to which the current circuits were not connected prior to the time delay if there has been no change in the input signal for a sufficiently long time.

The two immediately preceding paragraphs specifically mention only differential signalling. But single-ended (i.e., non-differential) signalling is also within the scope of the invention (e.g., by using as an output signal only the signal at one of the two output nodes mentioned in the two preceding paragraphs). The two immediately preceding paragraphs also specifically mention only two current circuits in the pre-emphasis circuitry. But more current circuits can be added, if desired, to produce pre-emphasis having more steps.

Further features of the invention, its nature and various advantages, will be more apparent from the accompanying drawings and the following detailed description of the preferred embodiments.

DETAILED DESCRIPTION

Most of the following detailed description assumes that differential signalling is being used. However, the invention is also applicable to non-differential, single-ended signalling. Use of the invention for such single-ended signalling will be explained at appropriate points in the following discussion.

Figure 1:
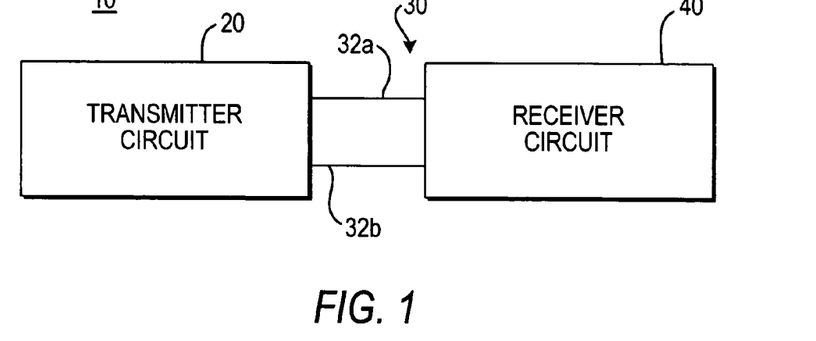
FIG. 1 is a simplified block diagram of illustrative circuitry that can be constructed and operated in accordance with the invention.

An illustrative system 10 employing digital signalling is shown in FIG. 1. System 10 includes transmitter circuit 20, receiver circuit 40, and a communication link 30 (including two conductors 32a and 32b) extending from circuit 20 to circuit 40. Communication link 30 is a differential signalling link, which means that different digital values are signalled by whether the voltage of the signal on lead 32a is higher than the voltage of the signal on lead 32b or vice versa. For example, digital value 1 may be represented by the voltage on conductor 32a being higher than the voltage on conductor 32b, and digital value 0 may be represented by the voltage on conductor 32b being higher than the voltage on conductor 32a. Typically in differential signalling it is desired for the average of the voltages on the two leads 32 (i.e., the so-called "common mode" voltage) to be substantially constant. There are a number of differential signalling protocols that can be supported by this invention. Examples of such protocols that are "industry standard" are LVDS and current mode logic ("CML") signalling. However, many variations of these standards can be supported by the invention, as can many non-standard protocols.

Figure 2:
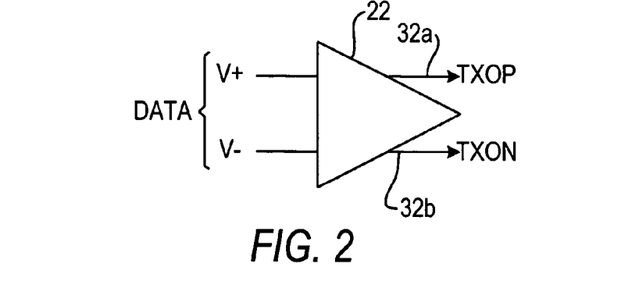
FIG. 2 is a simplified schematic diagram of a component that can be included in the FIG. 1 circuitry and that can be constructed and operated in accordance with the invention.

FIG. 2 shows an illustrative output driver 22 that can be included in transmitter circuit 20 in FIG. 1. The purpose of driver 22 is to convert a data signal (e.g., generated elsewhere in transmitter circuit 20) to a form suitable for application to conductors 32a and 32b. Driver 22 may employ a "true" version ("V+") of the data signal, and a "complement" (inverted) version ("V−") of the data signal (or driver 22 may receive only one of these signals and may itself generate any necessary inverted version of the received signal). Driver 22 responds to the V signal(s) by producing signals on leads 32a and 32b that represent the data content of the V signal(s) and that are consistent with the various parameters of the differential signalling protocol being employed in communication link 30. For example, these various parameters may include maximum and minimum voltages, permissible common mode voltage, polarity of voltage difference to represent data 1 and data 0, etc. Advantageously, output driver 22 is also designed in accordance with this invention to provide pre-emphasis associated with every transition in the data signal. This pre-emphasis is extra voltage in the TXOP and TXON signals on leads 32a and 32b for a certain amount of time immediately following every transition in the data signal. An illustrative embodiment of circuitry for implementing output driver 22 in accordance with this invention is shown in FIGS. 3 and 4.

Figure 3:
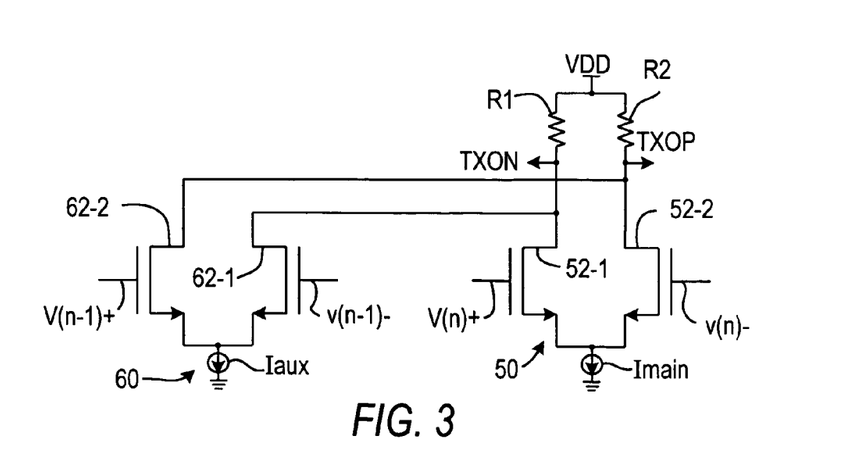
FIG. 3 is a more detailed, but still simplified, schematic diagram of an illustrative embodiment of a portion of the FIG. 2 circuitry in accordance with the invention.

In the circuitry shown in FIG. 3 VDD is the power supply voltage. Resistor R1 is connected in series between VDD and output node or connection TXON. Resistor R2 is similarly connected in series between VDD and output node or connection TXOP. NMOS transistor 52-1 is connected in series between node TXON and current sink Imain. NMOS transistor 52-2 is similarly connected in series between node TXOP and current sink Imain. Current sink Imain can be a conventional circuit element of the type that attempts to conduct a fixed, constant amount of current from its input (transistors 52-1 and 52-2) to its output (ground or VSS). "Imain" is also sometimes used herein as a reference for the fixed amount of current that this element attempts to conduct. (Although described above as a current "sink," this and other such elements herein may be alternatively referred to as a current "source" or as a current "circuit.") For convenience herein, elements 52-1, 52-2, and Imain may sometimes be referred to as a "main" current block 50.

Another block generally similar to block 50 is also included in FIG. 3. This other block—"auxiliary block" 60—includes NMOS transistors 62-1 and 62-2 and current sink Iaux. Transistor 62-1 is connected in series between node TXON and current sink Iaux. Transistor 62-2 is similarly connected in series between node TXOP and current sink Iaux. Current sink Iaux is generally like current sink Imain in that it tries to conduct a constant current (also referred to as current Iaux) from its input to ground.

Figure 4:
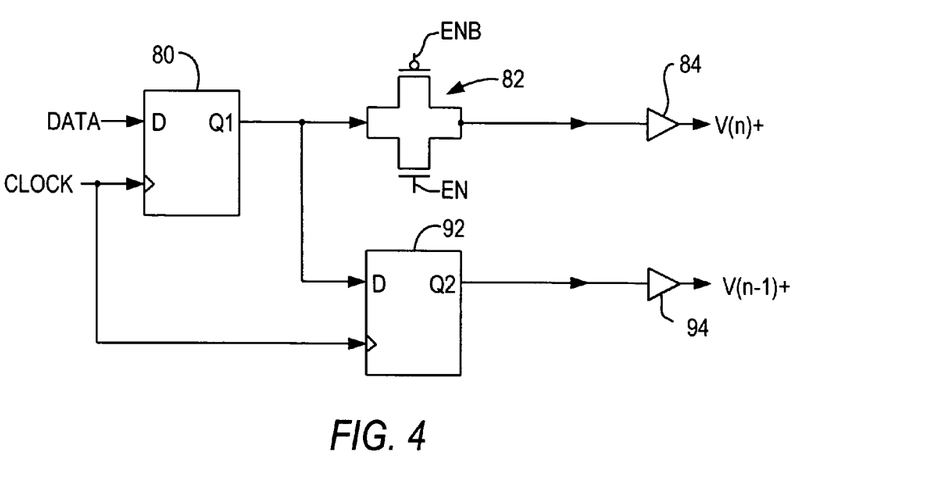
FIG. 4 is a more detailed, but still simplified, schematic diagram of an illustrative embodiment of another portion of the FIG. 2 circuitry in accordance with the invention.
Figure 5:
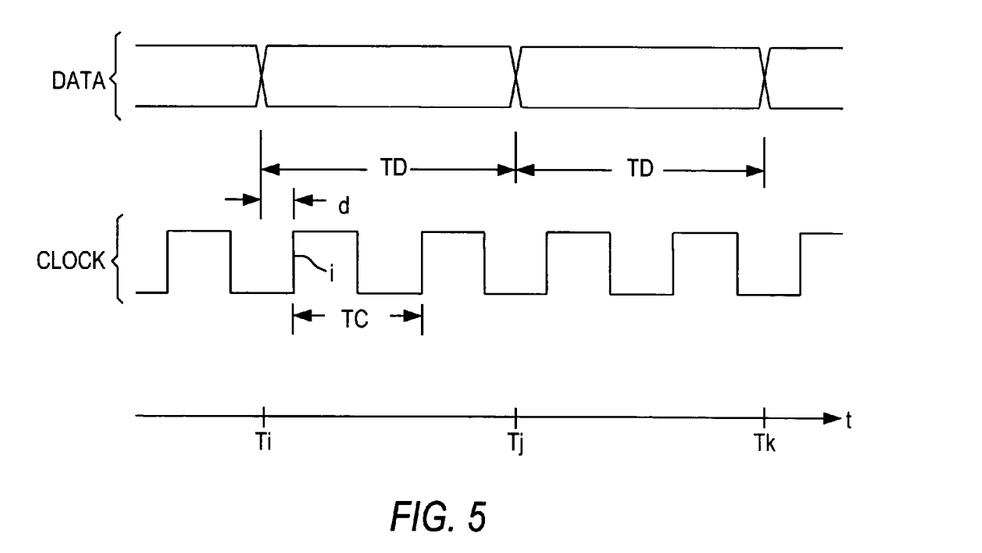
FIG. 5 shows simplified, illustrative waveforms that are useful in explaining the invention.

The signals V(n)+, V(n)−, V(n−1)+, and V(n−1)− for controlling transistors 52-1/2 and 62-1/2 in FIG. 3 may be produced as shown in FIG. 4. The data signal to be output is applied to the D input terminal of register or flip-flop circuit 80. A timing or waveform diagram of this data signal is shown in the upper part of FIG. 5. This part of FIG. 5 shows that each successive bit of information (whether a data 1 or a data 0) persists in the data signal for a period of time approximately equal to TD. Transitions can occur in the data signal at times like Ti, Tj, Tk, etc.

Flip-flop 80 is clocked by a clock signal having frequency and phase relative to the data signal generally as shown in FIG. 5. In this particular example, the period TC of the clock signal is half the nominal duration TD of each successive data value in the data signal, but other relationships between TC and TD (e.g., TC=TD, TC=TD/3, TC=TD/4, etc.) are also possible as will be explained in more detail below. Also in this example, every other positive-going transition in the clock signal is delayed slightly relative to possible transitions in the data signal. For example, positive-going clock signal transition is slightly delayed (by an amount of time d) relative to data transition time Ti. Flip-flop 80 responds to a positive-going transition in the clock signal by latching in and (after a short time delay) putting out (as Q1) the value of the data signal applied to its D input terminal when the positive-going transition in the clock signal occurred.

The Q1 output signal of flip-flop 80 is applied to the D input terminal of register or flip-flop 92. The Q1 output signal of flip-flop 80 is also passed through transmission gate 82, which preferably has the same propagation delay as flip-flop 92. The output signal of transmission gate 82 is passed through buffer 84 to become the V(n)+ control signal for the circuitry shown in FIG. 3. The complement of the V(n)+ signal is the V(n)− control signal for the circuitry shown in FIG. 3. Those skilled in the art will appreciate that it is a straight-forward matter to generate complement signal V(n)− from true signal V(n)+.

Turning now to flip-flop 92 in more detail, this device is clocked by the same clock signal as flip-flop 80. Flip-flop 92 therefore outputs (as Q2) the same data that flip-flop 80 outputs, but one full clock cycle after that data is output by flip-flop 80. The Q2 output signal of flip-flop 92 is passed through buffer 94 to become the V(n−1)+ control signal for the circuitry shown in FIG. 3. The complement of V(n−1)+ (again produced in a straight-forward way from V(n−1)+) is the V(n−1)− control signal for the circuitry shown in FIG. 3. As has been mentioned, the transmission delays of elements 82 and 92 are preferably approximately the same. The transmission delays of elements 84 and 94 are also preferably the same.

Figure 6:
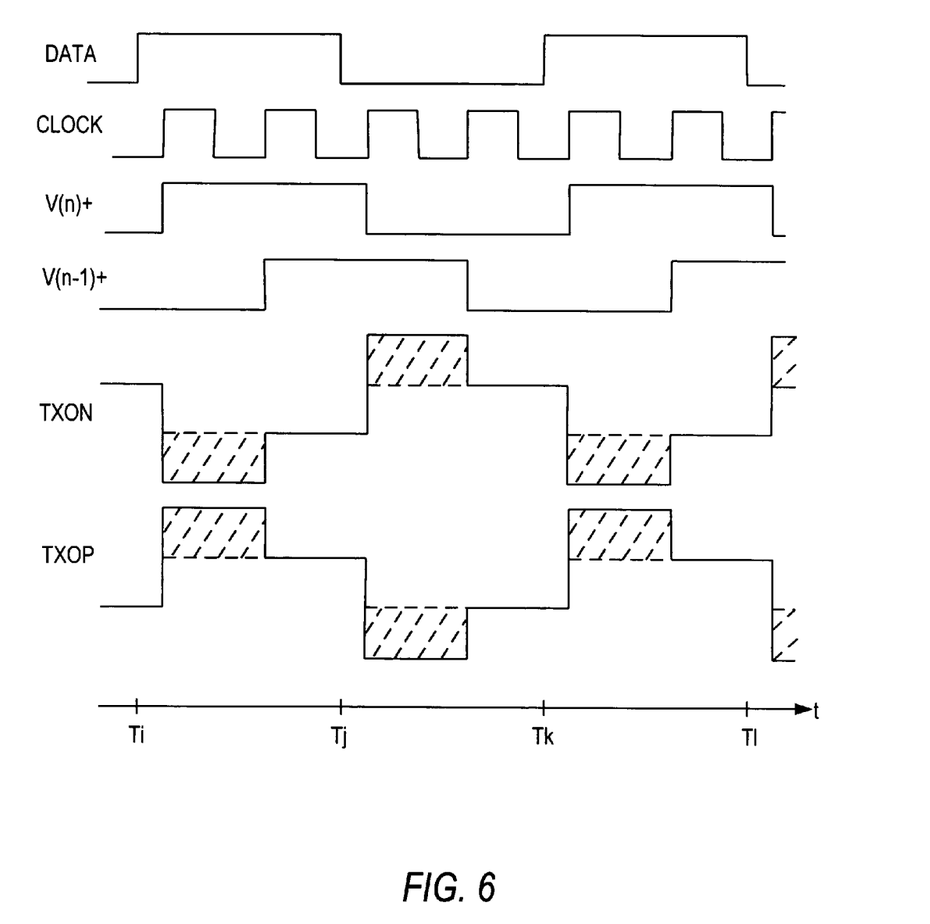
FIG. 6 shows more, simplified, illustrative waveforms that are useful in explaining the invention.

To expressly state what should already be clear from what has been said above, V(n−1)+ is V(n)+ delayed by one cycle of the depicted clock signal, and V(n−1)− is V(n)− similarly delayed by one cycle of the depicted clock signal. FIG. 6 shows V(n)+ and V(n−1)+ for an illustrative data stream, which happens to transition at every possible data transition time. For reference, FIG. 6 also shows the associated starting data signal, the clock signal, and the output signals TXON and TXOP (with pre-emphasis as shown by the shaded areas) that result from operating the FIG. 3 circuitry with V control signals as illustrated (in part) in FIG. 6. Each waveform in FIG. 6 has a separate vertical axis (which is voltage).

Considering FIG. 6 now in more detail, at data transition time Ti the data signal transitions from low to high. In response to the next positive-going transition in the clock signal, flip-flop 80 (FIG. 4) latches in and very shortly thereafter begins to output that high data value. Very soon thereafter, this causes V(n)+ to go high. (For simplicity in the further discussion that follows, the input-to-output delays of elements like 80, 82, 84, 92, and 94 will generally be ignored.) With V(n)+ high, V(n)− is low. V(n−1)+ is still low from the effect of the earlier low data value. This means that V(n−1)− is still high from that earlier data value. These values of V(n)+ and V(n)− cause transistor 52-1 to turn on and transistor 52-2 to turn off. The unchanged values of V(n−1)+ and V(n−1)− leave transistor 62-1 on and transistor 62-2 off. With both of transistors 52-1 and 62-1 on, TXON is pulled low very strongly by both of currents Imain and Iaux flowing away from the TXON node. This gives TXON its negative-going pre-emphasis (the shaded portion of the TXON waveform) associated with the data transition at time Ti. Conversely, both of transistors 52-2 and 62-2 are off, so TXOP is pulled strongly high by power supply VDD acting through resistor R2. This gives TXOP its positive-going pre-emphasis (the shaded portion of the TXOP waveform) associated with the data transition at time Ti.

The next time the depicted clock signal has a positive-going transition, flip-flop 92 (FIG. 4) latches and outputs (as Q2) the high Q1 output of flip-flop 80. This causes V(n−1)+ to go high and V(n−1)− to go low. V(n)+ and V(n)− are unchanged. These changes in V(n−1)+ and V(n−1)− cause transistor 62-1 to turn off and transistor 62-2 to turn on. Turning off transistor 62-1 causes TXON to be pulled low less strongly (because the Iaux current drain on that node is turned off, and only the Imain current drain on that node remains). This allows the voltage of TXON to rise somewhat (as shown immediately after the first shaded pre-emphasis area in FIG. 6). On the other hand, turning on transistor 62-2 causes the Iaux current to be drawn from the TXOP node, which causes the voltage of that node to drop as shown after the first shaded pre-emphasis area in the TXOP waveform in FIG. 6. This condition of the circuitry and its output signals (TXOP and TXON) continues until the next data transition at time Tj, as will now be described.

Shortly after the data signal changes from high to low at time Tj, the next positive-going transition in the depicted clock signal causes that low data value to be latched into and then output by flip-flop 80. This causes V(n)+ to change from high to low and V(n)− to change from low to high. This turns off transistor 52-1 and turns on transistor 52-2. The output of flip-flop 92 is unchanged, so transistor 62-1 remains off and transistor 62-2 remains on. With both of the transistors connected to the TXON node thus off, that node is pulled strongly toward VDD through resistor R1, giving TXON its positive-going pre-emphasis (the shaded area) just after Tj. On the other hand, with both of transistors 52-2 and 62-2 on, the TXOP node is pulled down strongly (by both of currents Imain and Iaux being drawn from that node). This gives TXOP its negative-going pre-emphasis (the shaded area) just after Tj.

The next positive-going transition in the depicted clock signal causes flip-flop 92 to latch in and then output the low data output of flip-flop 80. This causes V(n−1)+ to go low and V(n−1)− to go high. V(n)+ and V(n)− are unchanged. The low value of V(n−1)+ turns off transistor 62-2, while the high value of V(n−1)− turns on transistor 62-1. With transistor 62-1 on, VDD can no longer pull TXON as high as it previously did. Therefore, the voltage of TXON drops following its positive-going pre-emphasis period. Similarly, turning off transistor 62-2 reduces the current drain on-node TXOP from Imain+Iaux to just Imain. This allows the voltage of TXOP to rise somewhat following its negative-going pre-emphasis period.

The remainder of FIG. 6 is a repetition of what has now been described.

To summarize (in other terms) what has been said, pre-emphasis is given to an output signal (TXOP or TXON) by connecting either both or none of Imain and Iaux to that output node. At the end of the pre-emphasis period, Iaux is switched from one output node to the other. This reduces the current drain on the output node to which both current sinks were previously connected, and it applies some current drain to the output node that previously had no current drain.

The amount of pre-emphasis given by the circuitry of this invention depends on the relative strengths of current sinks Imain and Iaux. The greater that Iaux is relative to Imain, the greater the pre-emphasis fraction of the overall voltage swing of the output signal.

Figure 7:
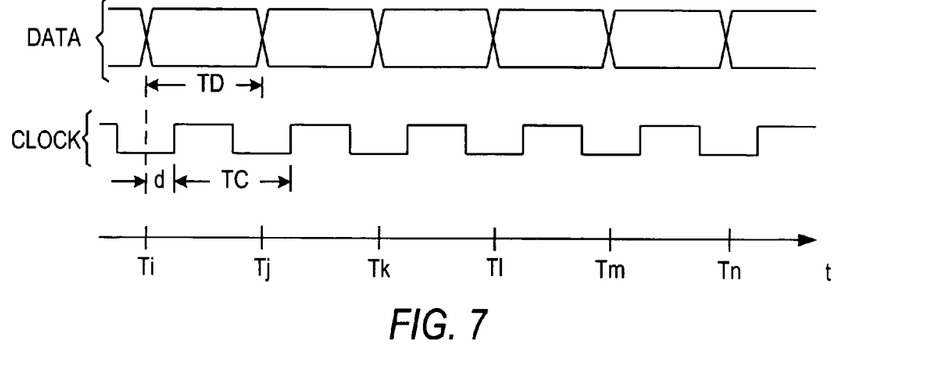
FIGS. 7 and 8 are respectively similar to FIGS. 5 and 6, but show other illustrative waveforms that are useful in explaining alternative modes of the invention.
Figure 8:
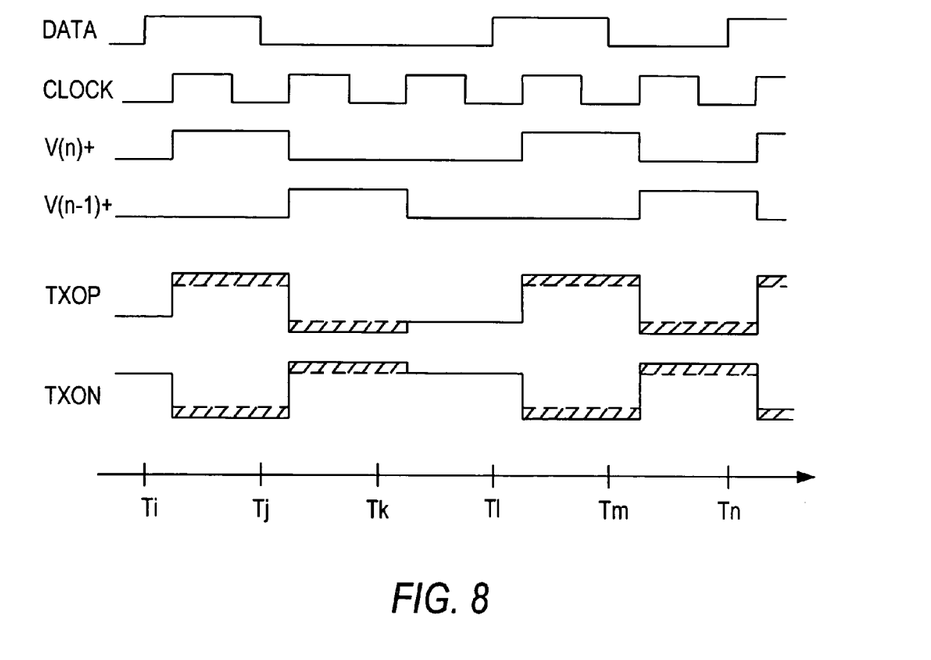

FIGS. 7 and 8 are respectively like FIGS. 5 and 6, but show an alternative use of pre-emphasis circuitry in accordance with this invention (e.g., circuitry as shown in FIGS. 3 and 4) with a clock signal having a period TC that is equal to TD. In other words, in FIGS. 7 and 8 TC=TD (rather than TC being equal to TD/2 as in FIGS. 5 and 6). Because in FIGS. 7 and 8 the only real change from what has been described above in connection with FIGS. 3–6 is the length of TC relative to TD, the following further discussion of FIGS. 7 and 8 can be somewhat abbreviated. To more clearly reveal the operation of the circuitry with TC=TD, FIG. 8 shows representative data which does not change at every possible data transition time. In particular, the representative data signal does not transition at possible transition time Tk in FIG. 8.

Assuming that the circuitry of FIGS. 3 and 4 is the circuitry operating on the data and clock signals shown in FIG. 8 to produce the other signals shown in that FIG., the first positive-going data pulse in FIG. 8 (which lasts for TD) causes V(n)+ to shortly thereafter go high for a period of time TC (=TD). V(n−1)+ remains low during this time interval. Both of the transistors 52-2 and 62-2 connected to node TXOP are therefore off, so that node TXOP is pulled strongly toward VDD via resistor R2. This gives TXOP the positive pre-emphasis that is shown by the left-most shaded region of TXOP in FIG. 8 and that lasts for TC=TD. At the same time, TXON is given negative pre-emphasis by both of transistors 52-1 and 62-1 being on. This negative pre-emphasis is shown by the left-most shaded region of TXON in FIG. 8.

Shortly after Tj, V(n)+ and V(n−1)+ both change state. This causes all of transistors 52-1/2 and 62-1/2 in FIG. 3 to change state. This in turn gives TXOP negative pre-emphasis and TXON positive pre-emphasis (next-to-left-most shaded regions in TXOP and TXON in FIG. 8). This pre-emphasis lasts for TC=TD.

Shortly after possible transition time Tk, when the data signal does not transition, V(n)+ also does not transition; but V(n−1)+ does transition to follow the already established value of V(n)+. Because V(n)+ and V(n−1)+ are now of the same polarity, each of nodes TXON and TXOP has only one of Imain and Iaux connected to it (not both or none of Imain and Iaux as previously). Accordingly, the pre-emphasis is removed from both of TXOP and TXON as shown by the next portion of those waveforms (near the middle of FIG. 8) having no shading in FIG. 8.

Shortly after Tl, when the data signal transitions again, V(n)+ changes state, thereby causing a repetition of what is shown toward the left in FIG. 8 (i.e., positive pre-emphasis given to TXOP and negative pre-emphasis given to TXON).

Shortly after Tm, when the data signal transitions again, the conditions shown shortly after Tj are repeated. Similarly, shortly after Tn, the conditions shown shortly after Ti or Tl are repeated.

To briefly summarize the operation illustrated by FIGS. 7 and 8 and described above, with TC=TD, each data transition causes TXOP and TXON to be thereafter appropriately pre-emphasized for a time period TC=TD. If the data signal does not transition toward the end of such a pre-emphasis period, the pre-emphasis is removed from TXOP and TXON until shortly after the next transition in the data signal. FIGS. 7 and 8 illustrate that TC does not have to be a fraction (less than one) of TD, but can be equal to TD if desired.

Figure 9:
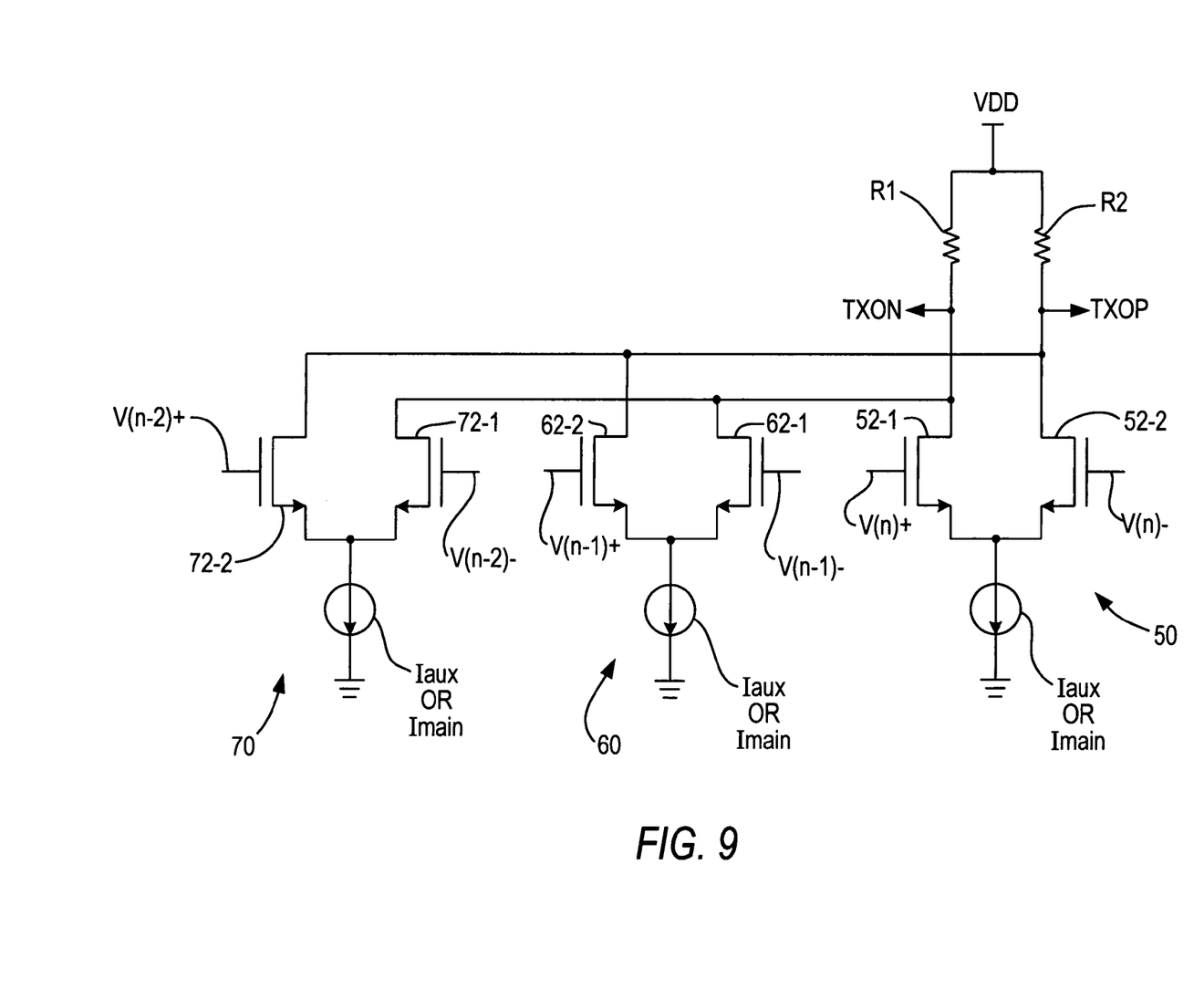
FIGS. 9 and 10 are respectively similar to FIGS. 3 and 4, but show another illustrative embodiment of circuitry in accordance with the invention.
Figure 10:
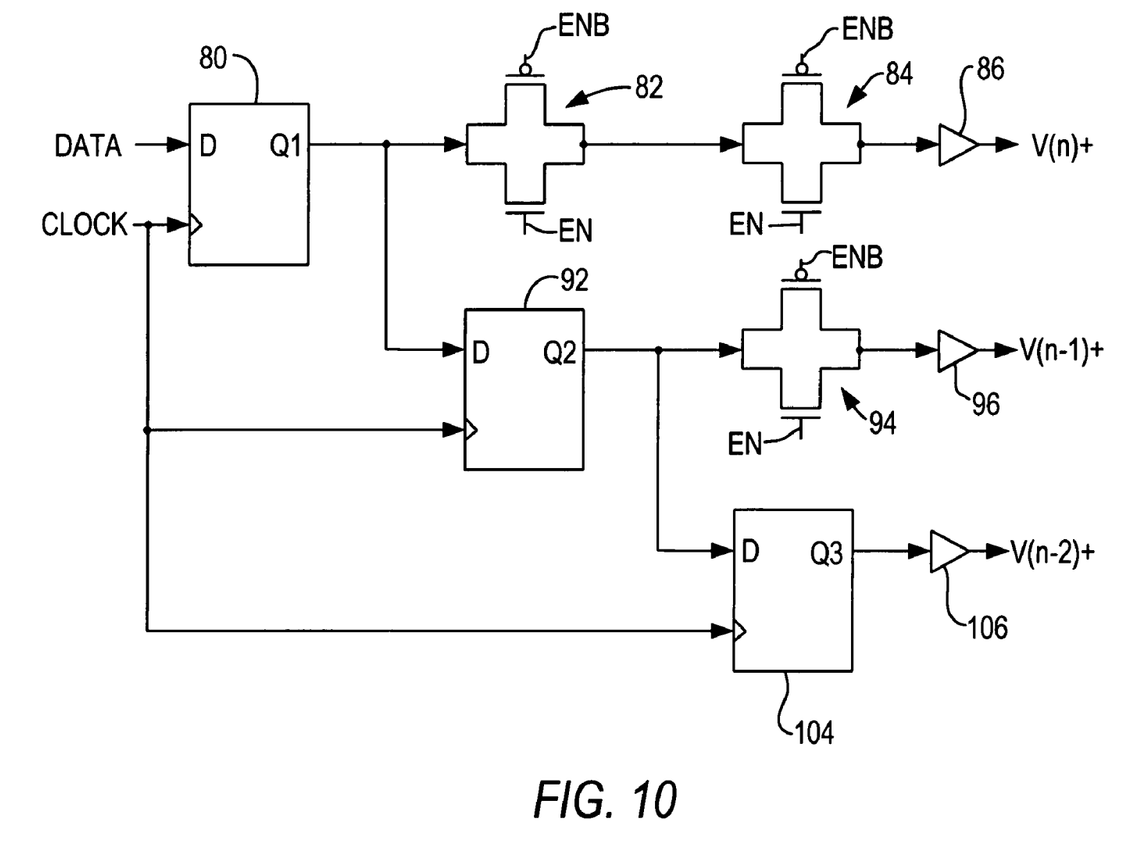

The illustrative circuitry shown in FIGS. 3 and 4 includes two current blocks 50 and 60. But it will be understood that the principles of the invention can be extended to embodiments having more than two such current blocks (e.g., three, four, five, or more current blocks). A circuit with two current blocks (e.g., as in FIGS. 3 and 4) may sometimes be referred to as a two-tap pre-emphasis circuit; a circuit with three current blocks may be referred to as a three-tap pre-emphasis circuit; and so on. FIGS. 9 and 10 show an illustrative embodiment of a three-tap pre-emphasis circuit. In addition to having all the same elements as the two-tap circuit (FIGS. 3 and 4), the three-tap circuitry shown in FIG. 9 has another current block 70 connected in parallel with blocks 50 and 60, and the three-tap control circuitry shown in FIG. 10 has another flip-flop 104 cascaded from flip-flop 92 and clocked by the same clock signal as flip-flops 80 and 92. Also in FIG. 10 transmission gates 84 and 94 are added and have the same propagation delay as flip-flop 104. All of buffers 86, 96, and 106 in FIG. 10 have the same propagation delay. The output of flip-flop 104 (buffered by buffer 106) is the control signal V(n−2)+, which (with its straight-forwardly produced complement V(n−2)−) provides control for current block 70 in FIG. 9. Any of the current sources in FIG. 9 can be Imain, while the others are Iaux current sources. The relative sizes of these current sources can be selected as desired to give desired amounts and shapes of pre-emphasis to the output signals TXOP and/or TXON. Multiple Iaux current sources can be of different sizes, if desired.

Figure 11:
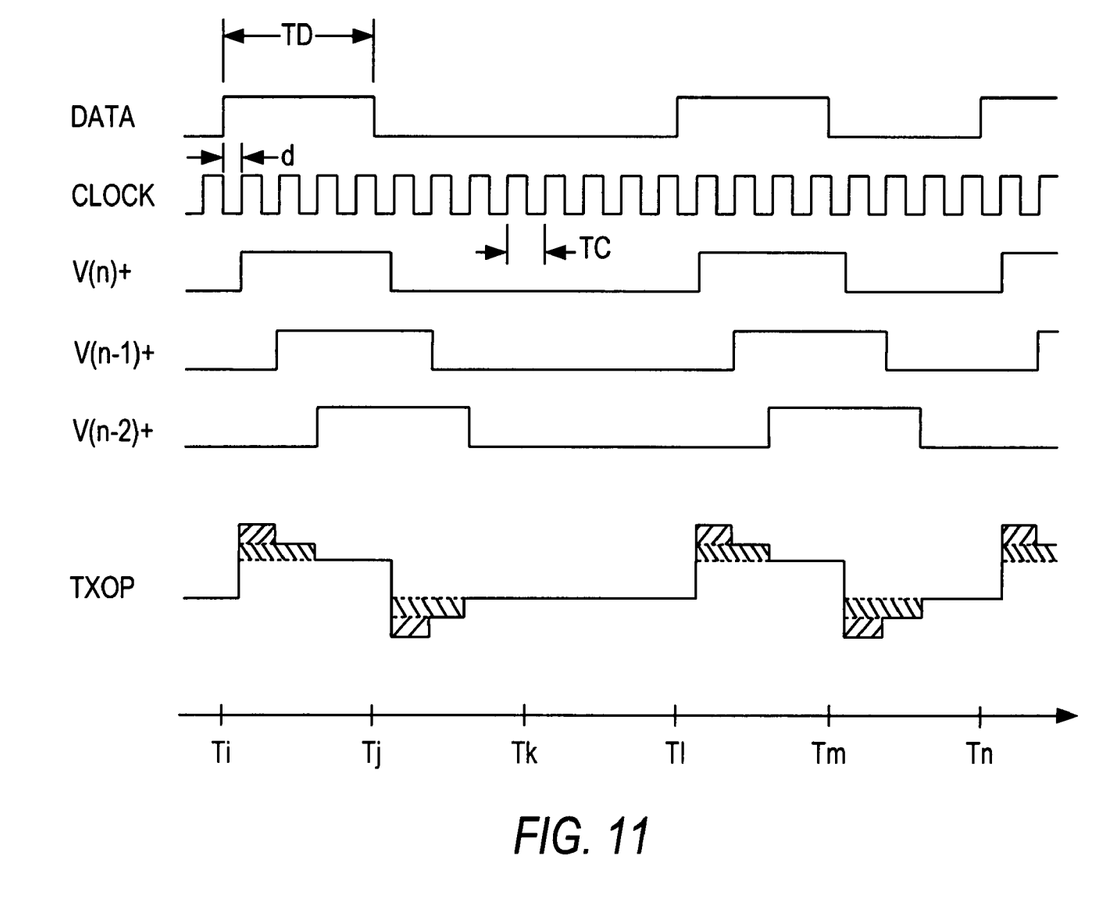
FIG. 11 shows simplified, illustrative waveforms that are useful in explaining illustrative operation of the FIGS. 9 and 10 circuitry in accordance with the invention.

FIG. 11 shows an example of operating circuitry of the type shown in FIGS. 9 and 10 with a clock signal having TC=TD/4. Because the circuitry of FIGS. 9 and 10 has three taps, TXOP is initially given (shortly after each transition in the data signal) a first relatively high amount of pre-emphasis (i.e., the sum of two shaded pre-emphasis regions in FIG. 11). This is because either none or all of the Imain and Iaux current sources are then connected to node TXOP. An interval TC later, the amount of pre-emphasis drops to a second relatively low amount (i.e., only one remaining shaded pre-emphasis region in FIG. 11). This is because the current source connections controlled by V(n−1)+ and V(n−1)− then switch the associated current source (in block 60) to the node (TXON or TXOP) to which that current source was not previously connected. A further interval TC later, all pre-emphasis is removed. This is because the current source connections controlled by V(n−2)+ and V(n−2)− then switch the associated current source (in block 70) to the node (TXON or TXOP) to which that current source was not previously connected.

It will be understood that the amount, duration, and shape of the pre-emphasis provided in accordance with this invention can be selected as desired by selecting such parameters as (1) the number of taps employed in the circuitry, (2) the sizes of the various Imain and Iaux current circuits, and (3) the relationship of TC to TD (e.g., whether TC=TD, TC=TD/2, TC=TD/3, or TC=TD/4, etc.).

It will also be understood that although differential signalling has generally been shown and described herein, the invention is equally applicable to single-ended (i.e., non-differential) signalling. For example, single-ended signalling with pre-emphasis in accordance with this invention can be provided by using only one (i.e., TXOP or TXON) of the outputs of the illustrative circuitry shown herein. FIG. 11 may be taken as an illustration of this in which only TXOP is shown (although it will also be understood that FIG. 11 can be straight-forwardly extended to also included TXON as the complement of TXOP if differential signalling is desired).

Figure 12:
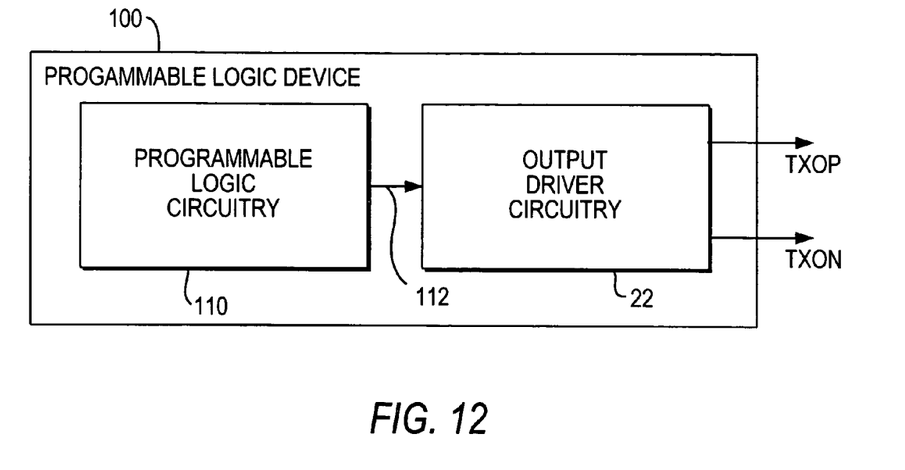
FIG. 12 is a simplified block diagram of illustrative circuitry employing the invention.

Although the circuitry of this invention has many other possible applications, one illustrative use is shown in FIG. 12. In FIG. 12, programmable logic device ("PLD") 100 is an integrated circuit that includes programmable logic circuitry 110 and output driver circuitry 22 (as described earlier in this specification). PLD 100 may be field programmable, mask programmable, or programmable in any other way. It may be one-time-only programmable, or it may be reprogrammable. The programmable logic circuitry 110 of PLD 100 produces a data output signal on lead 112 that is applied to output driver circuitry 22. Circuitry 22 converts this to differential output signals TXOP and TXON, with pre-emphasis, as described earlier in this specification. Thus PLD 100 is one illustrative embodiment of transmitter circuitry 20 of the general type shown in FIG. 1. (If only single-ended signalling is desired, only one or the other of TXOP or TXON is used as mentioned above.)

Figure 13:
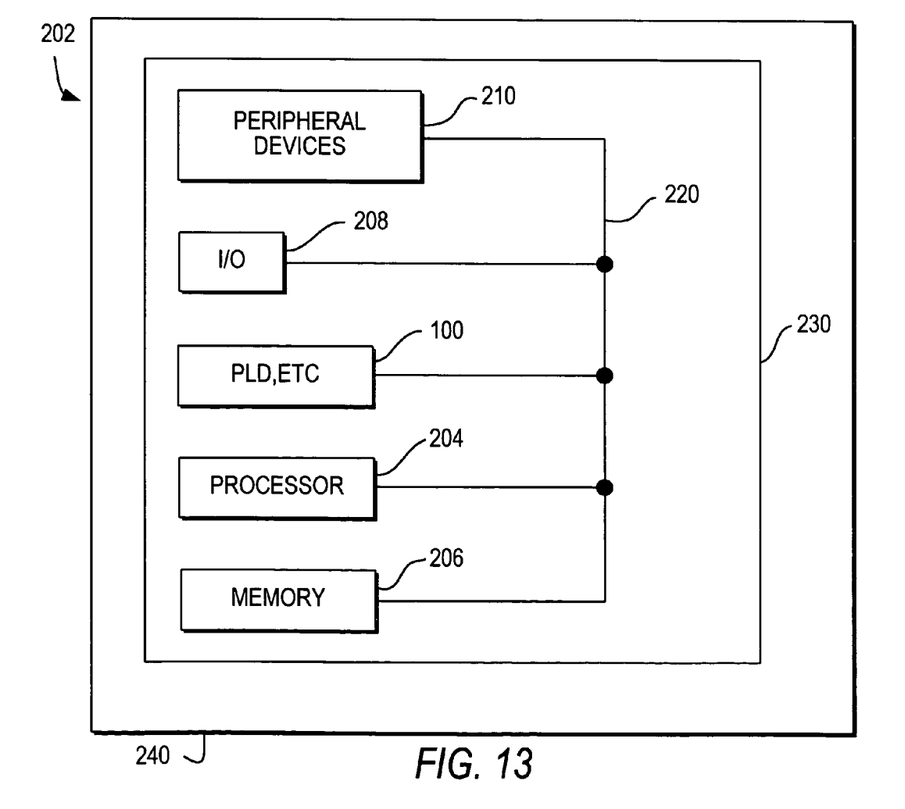
FIG. 13 is a simplified block diagram of an illustrative system that can make use of the invention.

FIG. 13 shows an illustrative larger context in which the invention may be employed. The invention can be used for driving one or more output signals from any one or more of elements 100, 204, 206, 208, and 210 out onto system bus or other interconnections 220. Although the invention is equally applicable in many other types of systems, the illustrative system 202 shown in FIG. 13 may be generally described as a data processing system.

Data processing system 202 may include one or more of the following components: PLD or other circuitry 100 like that shown in FIG. 7, a processor 204, a memory 206, I/O circuitry 208, and peripheral devices 210. These components are coupled together by a system bus or other interconnections 220, and are populated on a circuit board 230 (e.g., a printed circuit board) that is contained in an end-user system 240. Communication among the various components shown in FIG. 13 and/or with external circuitry may be of the type described earlier in this specification to any desired extent.

System 202 can be used in a wide variety of applications, such as computer networking, data networking, instrumentation, video processing, digital signal processing, or the like. Circuitry 100 can be used to perform a variety of different logic functions. For example, circuitry 100 can be configured as a processor or controller that works in cooperation with processor 204. Circuitry 100 may also be used as an arbiter for arbitrating access to a shared resource in system 202. In yet another example, circuitry 100 can be configured as an interface between processor 204 and one of the other components of system 202. It should be noted that system 202 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention. For example, the relative sizes of Imain and the auxiliary current sink(s) Iaux can be varied so that the circuit gives the output signals different amounts and/or shapes of pre-emphasis. As another example, the frequency of the depicted clock signal can be changed to change the duration of the pre-emphasis relative to the duration TD of a data pulse. Pre-emphasis can be implemented in two-tap (e.g., FIGS. 3 and 4) or multi-tap (e.g., as shown and described in connection with FIGS. 9 and 10) circuit configurations.

What is claimed is:

1. Circuitry for giving pre-emphasis to first and second differential nodes comprising:
   first and second current circuits; and
   switching circuitry that responds to a transition in a data signal by initially connecting both of the current circuits to only one of the nodes, and by subsequently connecting one of the current circuits only to the one of the nodes to which neither of the current circuits is initially connected if there is no further transition in the data signal for a predetermined time after the transition.

2. The circuitry defined in claim 1 wherein each of the current circuits is a current-sinking circuit.

3. The circuitry defined in claim 1 further comprising:
   a power supply voltage source; and
   first and second resistor circuitries respectively connecting the first and second nodes to the power supply voltage source.

4. The circuitry defined in claim 1 wherein the switching circuitry comprises:
   first register circuitry for latching in and outputting the data signal shortly after the transition.

5. The circuitry defined in claim 4 wherein the switching circuitry further comprises:
   second register circuitry for latching in and outputting the data signal output by the first register circuitry shortly after the first register circuitry begins to output that data signal.

6. The circuitry defined in claim 5 wherein an output of the first register circuitry is used to determine which of the nodes the first current circuit is connected to, and wherein an output of the second register is used to determine which of the nodes the second current circuit is connected to.

7. The circuitry defined in claim 1 further comprising:
   a third current circuit, and wherein the switching circuitry further responds to the transition in the data signal by initially also connecting the third current circuit to only the one of the nodes, by (during said subsequently connecting) leaving connection of the third current circuit unaltered, and by still more subsequently connecting the third current circuit only to the one of the nodes to which it is not initially connected if there is no further transition in the data signal for a further predetermined time after the transition.

8. The circuitry defined in claim 1 further comprising:
   first and second output leads for respectively outputting differential signals from the first and second differential nodes.

9. The circuitry defined in claim 1 further comprising:
   an output lead for outputting a single-ended output signal from only one of the first and second nodes.

10. A programmable logic device including circuitry as defined in claim 1.

11. A digital processing system comprising:
    processing circuitry; and
    a memory coupled to the processing circuitry, wherein at least one of the processing circuitry and the memory includes circuitry as defined in claim 1.

12. An integrated circuit including circuitry as defined in claim 1.

13. A printed circuit board on which is mounted circuitry as defined in claim 1.

14. The printed circuit board defined in claim 13 further comprising:
    a memory mounted on the printed circuit board.

15. The printed circuit board defined in claim 13 further comprising:
    processing circuitry mounted on the printed circuit board.

16. Output driver circuitry comprising:
    first and second nodes;
    a plurality of current sinking circuits; and
    switching circuitry that is controllable based on a signal to be output to connect, at a first time, all of the current sinking circuits to only a selected one of the nodes, and to connect, at a second subsequent time, only a subset of the current sinking circuits to only the one of the output nodes to which that subset was not connected at the first time if there has been no change in the signal to be output from the first time to the second time.

17. The circuitry defined in claim 16 wherein the switching circuitry comprises:
    delay circuitry for establishing a delay between the first and second times.

18. The circuitry defined in claim 17 wherein the delay circuitry comprises register circuitry.

19. The circuitry defined in claim 18 wherein the signal to be output has a pulse duration, and wherein the switching circuitry further comprises circuitry for clocking the register circuitry with a clock signal having a period that is approximately equal to the pulse duration.

20. The circuitry defined in claim 18 wherein the signal to be output has a pulse duration, and wherein the switching circuitry further comprises circuitry for clocking the register circuitry with a clock signal having a period that is a fraction of the pulse duration.

21. A method of giving pre-emphasis to differential signals at a pair of nodes comprising:
    connecting first and second current circuits to only a selected one of the nodes in response to receipt of an input signal; and
    after a time delay interval, connecting only the second of the current circuits to only the one of the nodes to which both of the current circuits were not connected prior to the time delay interval if the input signal is unchanged during the time delay interval.

22. The method defined in claim 21 further comprising:
    after the time delay interval, leaving the first current circuit connected only to the node to which both of the current circuits were connected prior to the time delay interval if the input signal is unchanged during the time delay interval.

23. The method defined in claim 21 further comprising:
    connecting the first and second nodes to a power supply voltage source through respective first and second resistors.

24. The method defined in claim 21 further comprising:
    clocking the input signal through a plurality of cascaded registers to produce the time delay interval.

25. The method defined in claim 21 wherein the input signal has a predetermined pulse duration, and wherein the time delay interval is approximately equal to the pulse duration.

26. The method defined in claim 21 wherein the input signal has a predetermined pulse duration, and wherein the time delay interval is a fraction of the pulse duration.

* * * * *